(No Model.)
W. H. BACHE.
BEARING.
No. 486,061. Patented Nov. 8, 1892.
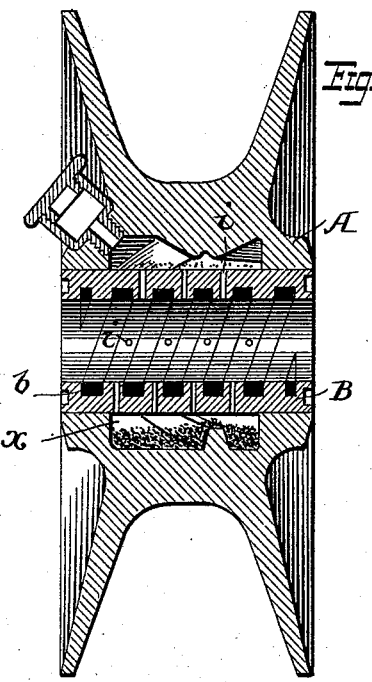
Fig. 1.
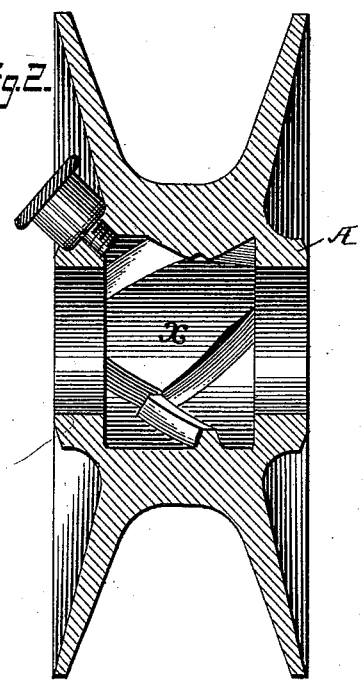
Fig. 2.
Fig. 3.
Fig. 4.
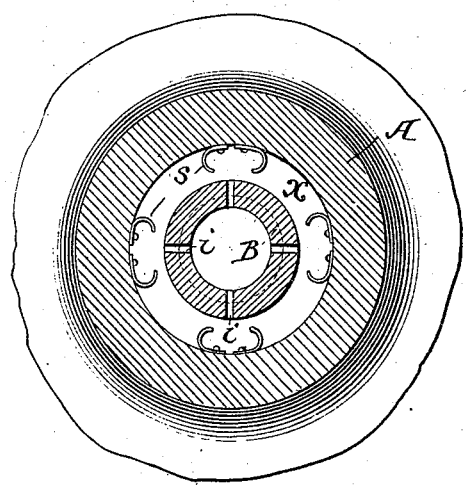
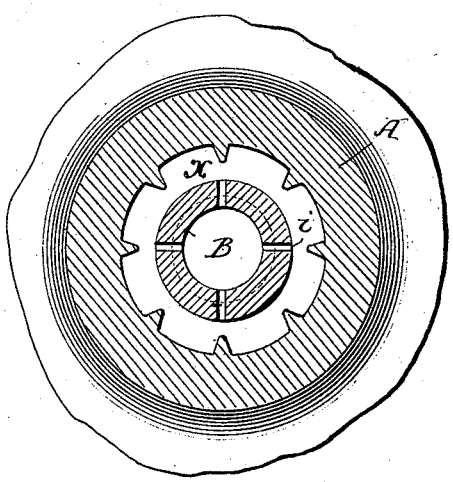
Witnesses
Jno. G. Hinkel
Alle N. Dobson
Inventor
William H. Bache
By Foster Freeman
Attorneys

UNITED STATES PATENT OFFICE.

WILLIAM H. BACHE, OF BOUND BROOK, NEW JERSEY, ASSIGNOR OF ONE-HALF TO WILLIAM W. SMALLEY, OF SAME PLACE.

BEARING.

SPECIFICATION forming part of Letters Patent No. 486,061, dated November 8, 1892.

Application filed April 25, 1892. Serial No. 430,569. (No model.)

*To all whom it may concern:*

Be it known that I, WILLIAM H. BACHE, a citizen of the United States, residing at Bound Brook, Somerset county, State of New Jersey, have invented certain new and useful Improvements in Bearings, of which the following is a specification.

It has been found very advantageous to make use of antifriction-bearings consisting of bushings having grooves or pockets for the reception of a hard antifriction material—as, for instance, plumbago composition. As the composition is somewhat pliable, especially when heated, it is apt to wear away more rapidly than the intermediate surfaces of the metallic bushing, which therefore are left in the form of hard metallic rims that of course increase the friction. I have effectually remedied the difficulty in such cases by providing means whereby to supply the material to the recesses or pockets of the said bushings, so as to maintain them constantly in a proper condition and maintain a uniform wearing or bearing surface for the journals. To this end I construct my bushing and the part to which it is applied, whether it be a wheel or a stationary portion of a bearing, as fully set forth hereinafter, and as illustrated in the accompanying drawings, in which—

Figure 1 is a section of a trolley-wheel, illustrating my improvement. Fig. 2 is the same with the bushing removed. Figs. 3 and 4 are sections illustrating other forms of vanes or deflectors.

B represents the hub or bushing, and A represents the bearing or support therefor to which it is applied, which may be the casing of a box, but, as shown, is the hub of a wheel, being in the form of a trolley-wheel. The bushing B is cylindrical and is provided with a series of pockets $b$, of any suitable shape, adapted to receive and fill with a lubricating composition of a hard character—as, for instance, plumbago composition, such as is now in common use—or the bearing-surface may consist of a hollow cylindrical block of graphite compound inserted in a suitable mold. Whatever may be the construction of the part to which the antifriction bearing or composition is applied, or however it may be arranged, the same is surrounded by a chamber $x$, formed in the part A, which chamber constitutes a receptacle for a powdered lubricant—as, for instance, powdered plumbago or powdered plumbago composition—and in order to supply this powdered lubricant to the surface of the journal the bushing B is perforated at intervals, so as to constitute channels leading from the inner surface of the bushing to the chamber $x$. As a consequence of this arrangement, if there should be any wearing away of the surface of the material by friction, the powdered lubricant from the chamber $x$ will work its way through the recesses and onto the surface of the antifriction material and will adhere to the latter and gradually build the same up, so that there is no formation of grooves or channels or recesses, as in such bearings as heretofore made.

While I am aware that it is common to supply oil and other lubricating fluids to the surface of journals through the bearings by channels therein, it will be seen that this simply affords a means of bringing a lubricating material to the face of the journal and that it is essentially different from what is proposed by my improvement, which is to bring to the pockets or receptacles in the bushing B a material which will fill such pockets or receptacles or aid in filling the same after they have once been filled, so as to maintain them in a full condition and secure an even and uniform surface at all times for the journal to rest against. In other words, I continually by this means build up the bearing-surface instead of merely supplying a lubricant between two bearing-surfaces, and I have found by repeated experiment that by this means I am enabled to make use of bushings containing any lubricant compositions for a very much longer time than would be practicable under any of the ordinary circumstances. While this arrangement of parts above described is effective in the case of pulleys or wheels with those which revolve at a slow speed, it has been found that wherever the speed becomes excessive the outer lubricant is thrown to the exterior of the chamber $x$ and will not pass through the openings or channels $i$. I therefore provide the chamber $x$ with a series of vanes or wings of any suitable character, which extend but part way between the wall of the chamber and the outer surface of the bushing, so that they do not divide the chamber into separate compartments, and which will catch hold of the powdered material and tend to deflect or throw it toward the back of the bushing B, so that it will pass through the openings $i$ therein. These vanes or wings may be of any suitable construction and formed in any suitable way. As shown in Figs. 2 and 3, they are inclined or diagonal ribs with V-shaped or inclined faces arranged on the inside of the hub and formed by means of copper cores in casting the wheel. In Fig. 3 the vanes are shown as applied to a wheel of larger size consisting of a series or two series of curved plates $s$, arranged reversely, so that each plate will form a sort of a bucket to catch certain portions of the material and throw it onto the back of the bearing-beam whichever direction the wheel may be turned. In the construction shown in Fig. 4 there are transverse vanes with the inclined faces. It will be evident that these may be constructed and arranged in various ways so as to secure the desired result, and their use has been found to be extremely effective and containing the supply of powdered lubricant to the channel $i$, however rapidly the wheel may revolve.

The wheel may be cast solid in one piece or formed in sections, as usual, the latter being preferable where it is necessary to insert the vane.

Without limiting myself to the precise construction and arrangement of parts shown and described, I claim—

1. A bushing provided with a hard antifriction composition, the bearing or support in which the bushing is mounted, provided with a chamber outside of the bushing, channels through the bushing from the face thereof to said chamber, and a powdered antifriction material in said chamber adapted to reinforce the said composition, substantially as set forth.

2. The combination, in a rotating bearing, of a bushing having pockets containing a hard antifriction composition or material, the rotating bearing in which the bushing is mounted, having a chamber outside of and surrounding the said bushing, channels through the bushing, and a reinforcing powdered material in said chamber adapted to build up the material of the pockets, substantially as set forth.

3. The combination, in a wheel or pulley, of a hollow cylindrical bushing, a chamber around the same, channels through said bushing, a powdered antifriction material in the said chamber, and vanes or deflectors, substantially as and for the purpose described.

4. The combination, with a wheel or pulley, of a bushing inserted therein, the wheel being provided with a continuous chamber surrounding the bushing, the channels through the bushing, the powdered antifriction material in the chamber, and the vanes or deflectors situated in the chamber and extending only part way between the bushing and the wall of the chamber, substantially as set forth.

In testimony whereof I have signed my name to this specification, in the presence of two subscribing witnesses.

W. H. BACHE.

Witnesses:
 GEORGIA P. KRAMER,
 ALLE N. DOBSON.